United States Patent
Suh et al.

(10) Patent No.: US 9,172,096 B2
(45) Date of Patent: Oct. 27, 2015

(54) END PLATE FOR FUEL CELL INCLUDING SANDWICH INSERT

(75) Inventors: Jung Do Suh, Seoul (KR); Sae Hoon Kim, Yongin (KR); Byung Ki Ahn, Seongnam (KR); Jin Yong Park, Incheon (KR); Ji Yong Kim, Incheon (KR)

(73) Assignees: Hyundai Motor Company, Seoul (KR); Kia Motors Corporation, Seoul (KR); Daewon Kang Up Co., Ltd., Seoul (KR)

( * ) Notice: Subject to any disclaimer, the term of this patent is extended or adjusted under 35 U.S.C. 154(b) by 994 days.

(21) Appl. No.: 13/312,543

(22) Filed: Dec. 6, 2011

(65) Prior Publication Data
US 2013/0065157 A1 Mar. 14, 2013

(30) Foreign Application Priority Data
Sep. 8, 2011 (KR) .................. 10-2011-0091151

(51) Int. Cl.
*H01M 2/14* (2006.01)
*H01M 8/02* (2006.01)

(52) U.S. Cl.
CPC .......... *H01M 8/0221* (2013.01); *H01M 8/0228* (2013.01); *H01M 8/0206* (2013.01); *H01M 8/0213* (2013.01); *Y02E 60/50* (2013.01)

(58) Field of Classification Search
CPC ............ H01M 8/0228; H01M 8/0221; H01M 8/0206; H01M 8/0213; Y02E 60/50
USPC .......................................................... 429/510
See application file for complete search history.

(56) References Cited

U.S. PATENT DOCUMENTS 6,372,372 B1 * 4/2002 D'Aleo et al. ............... 429/434

FOREIGN PATENT DOCUMENTS

| JP | 2005-011624 | 1/2005 |
|----|----|----|
| JP | 2008-071506 A | 3/2008 |
| JP | 2008-277303 A | 11/2008 |
| JP | 2010-140755 A | 6/2010 |
| JP | 2011-018462 | 1/2011 |
| KR | 10-0757131 B1 | 9/2007 |
| KR | 10-0988228 | 10/2009 |
| KR | 10-2011-0059982 A | 6/2011 |
| KR | 10-2011-0059990 | 6/2011 |

* cited by examiner

*Primary Examiner* — Gary Harris
(74) *Attorney, Agent, or Firm* — Mintz Levin Cohn Ferris Glovsky and Popeo, P.C.; Peter F. Corless (57) ABSTRACT

The present disclosure provides an end plate for a fuel cell including a sandwich insert, in which a metal insert has a sandwich insert structure including a plurality of stacked plates, thereby securing strength and achieving a lightweight structure. The sandwich insert is manufactured by staking two or more plates, each having a specific shape, followed by injection molding the sandwich insert with a plastic injection molded body, thereby securing strength and also achieving a lightweight structure, contrary to a conventional integral metal insert.

8 Claims, 7 Drawing Sheets

END PLATE FOR FUEL CELL INCLUDING SANDWICH INSERT

CROSS-REFERENCE TO RELATED APPLICATION

This application claims under 35 U.S.C. §119(a) the benefit of Korean Patent Application No. 10-2011-0091151 filed Sep. 8, 2011, the entire contents of which are incorporated herein by reference.

BACKGROUND (a) Technical Field

The present invention relates to an end plate for a fuel cell including a sandwich insert. More particularly, it relates to an end plate for a fuel cell including a sandwich insert, in which a metal insert has a sandwich insert structure including a plurality of stacked plates, thereby securing strength and achieving a reduction in weight.

(b) Background Art

Figure 7:
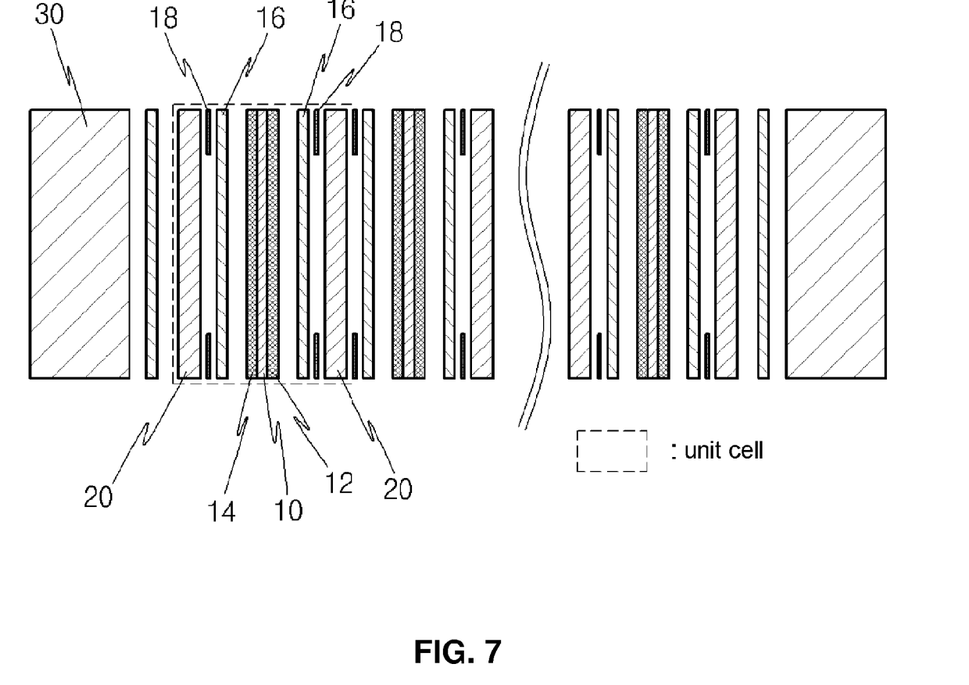
FIG. 7 is a view schematically illustrating a fuel cell stack.

Referring to FIG. 7, in a unit cell of a fuel cell stack mounted on a fuel cell vehicle, a Membrane-Electrode Assembly (MEA) is located at the innermost side of the unit cell of the fuel cell stack. The MEA includes a solid polymer electrolyte membrane 10, through which protons pass, and catalytic electrode layers, i.e., a cathode 12 and an anode 14, coated on opposite surfaces of the solid polymer electrolyte membrane 10 such that hydrogen can react with oxygen.

Gas Diffusion Layers (GDL) 16 and gaskets 18 are sequentially stacked outside the cathode 12 and the anode 14. Separation plates 20, which include flow fields for supplying fuel and discharging water generated by the reaction, are located outside the GDLs 16.

After several hundreds of unit cells of the fuel cell stack are stacked, end plates 30 for supplying and fixing each of the unit cells are assembled at the outermost sides of the fuel cell stack.

In this case, a current collector plate for collecting electricity generated in the fuel cell stack and sending the collected electricity to the outside is mounted inside the end plates 30.

Accordingly, an oxidation reaction of hydrogen occurs in the anode 14 of the fuel cell stack, and protons and electrons are generated. At this time, the generated protons and electrons first flow to the cathode 12 through the solid polymer electrolyte membrane 10, and then to the separation plate 20. As a result, water is generated in the cathode 12 through an electrochemical reaction of the protons and electrons from the anode 14 with oxygen in the air. Electric energy is then generated through flow of the electrons and is supplied to a load requiring electric energy through the current collector plate of the end plates 30.

The end plates 30 of the fuel cell stack, which are located at opposite sides of the fuel cell stack, serve to fasten a plurality of stacked separation plates, MEAs, and GDLs, and further serve to provide a uniform surface pressure to each unit cell.

Figure 6:
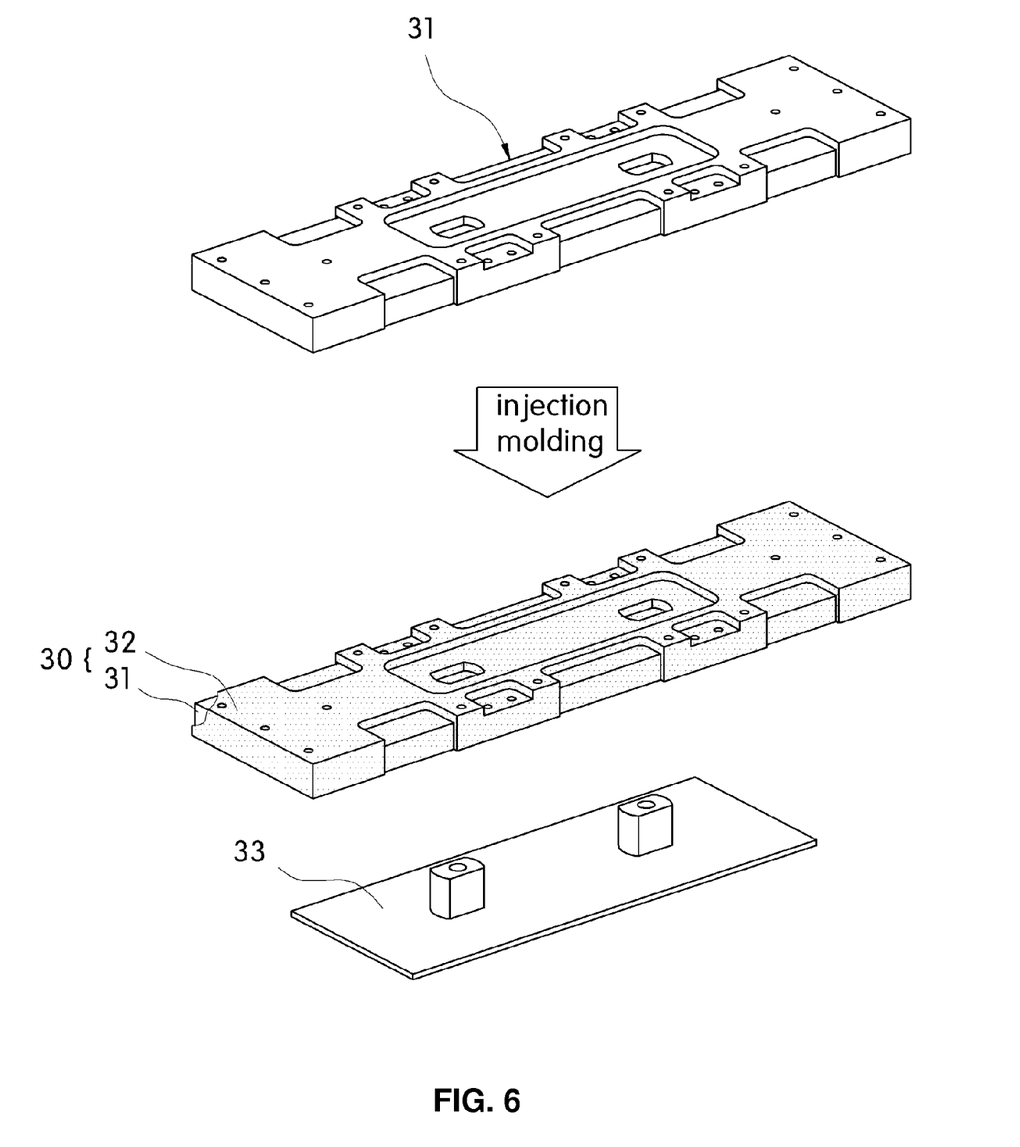
FIG. 6 is a perspective view illustrating a conventional end plate.

As can be seen in FIG. 6, the end plate 30 is formed from a metal insert 31, a plastic injection molded body 32, and a current collector plate 33, which are integrally formed to provide reduced weight and electric insulation.

In particular, the metal insert 31 is disposed inside an injection mold and then a plastic injection molding material is filled in the injection mold, so that the end plate 30, including the metal insert 31 surrounded by the plastic injection molded body 32, is thus formed.

The current collector plate 33 can also be disposed inside the injection mold together with the metal insert 31, and injection molded together with the plastic injection molded body 32. Alternatively, the current collector plate 33 can at a later time be separately assembled inside the plastic injection molded body 32.

The metal insert 31 of the end plate must have a high strength to resist an inner surface pressure. Accordingly, the metal insert 31 is generally manufactured through machining of a metal material, and is also typically manufactured in a complicated shape that may enhance its ability to collect generated electricity of the fuel cell stack and to fasten the fuel cell stack.

However, according to conventional methods, the metal insert of the end plate is manufactured in an integral shape, which results in a number of disadvantages.

First, in machining a lightweight material reducing structure for the metal insert, it is difficult to injection mold the metal insert. In particular, a recess or an uneven portion should not be generated on a resin surface after the injection molding of the end plates so as to prevent a fuel leak when the contact is secured with the gaskets. However, in applying the material reducing structure to the metal insert, if a thickness of the resin material of the plastic injection molded body is not uniform, a recess or an uneven portion is disadvantageously generated on the surface of the resin due to contraction of the resin. In particular, if pocket processing is performed so as to apply the material reducing structure to the integral metal insert for reducing the weight, it is difficult to uniformly maintain the thickness of the injection molding material.

Second, the integral metal insert is manufactured through cutting a metal plate or a non-metal plate through machining, so it takes a long time to manufacture the single integral metal insert. This not only makes mass production difficult, but also makes it more challenging to reduce costs.

Third, the integral metal insert should be made of a single material, so there is a difficulty in utilizing different materials for reducing weight and improving strength.

SUMMARY OF THE DISCLOSURE

The present invention provides an end plate for a fuel cell including a sandwich insert, in which the sandwich insert is manufactured by staking two or more plates each having a specific shape. According to embodiments of the invention, the sandwich insert is injection molded with a plastic injection molded body, thereby securing strength and, at the same time, providing a lightweight structure, in contrast with conventional integral metal inserts.

In one aspect, the present invention provides an end plate for a fuel cell including: sandwich inserts having a sandwich structure in which two or more plates are bonded by a coupling means, wherein outer-surfaces of the sandwich inserts are surrounded by a plastic injection molding material.

In an exemplary embodiment, the sandwich insert includes: a first plate having first current collector plate coupling openings at a central portion thereof; a second plate having two or more first material-reducing spaces at a central portion thereof; a third plate having third current collector plate coupling openings at a central portion thereof; and a fourth plate having a second material-reducing space at a central portion thereof.

In another exemplary embodiment, anti-bending plates having second current colleting plate coupling openings are inserted into the first material-reducing spaces of the second plate so as to prevent the sandwich insert from being bent.

The coupling means can be any conventional coupling means suitable for use in fuel cells. For example, in an exemplary embodiment, the coupling means is selected from a bonding means including a liquid or film type adhesive, and a mechanical coupling means including, for example, a bolt, a rivet, or an assembling pin.

In yet another exemplary embodiment, the sandwich insert is made of at least one material selected from a steel material, a nonmetallic material, a carbon-based material, and a composite material.

Accordingly, the present invention provides the following effects.

According to the present invention, the insert of the end plate has a stacked structure of several plates, so it is possible to provide the various layers with desired characteristics to form an overall stacked structure that both obtains a desired strength and provides a lightweight insert. According to some embodiments, weight reduction can be further achieved by forming one or more material-reducing spaces in one or more of the plates.

Further, the several plates can be made of different materials (e.g., a light carbon-based material, and a material having an excellent strength such as steel) and are combined for use, thereby further improving both the weight reduction and strength of the insert.

In some embodiments, a separate anti-bending plate is further inserted into one or more material-reducing spaces of a plate, preferably the centrally stacked plate among the several stacked plates. The anti-bending plate can thus enhance the overall strength of the insert and can prevent the metal insert from being bent due to a resin pressure applied in the injection molding process, and at the same time can effectively improve bending strength by increasing the secondary moment of inertia of the sandwich insert.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not imitative of the present invention, and wherein.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides an end plate for a fuel cell that is both lightweight and strong. In particular, the present invention provides an end plate that includes a sandwich insert 100, in which two or more plates are stacked and bonded by a coupling means 500, and wherein the sandwich insert 100 is surrounded with a plastic injection molding material to form a plastic injection molded body 200. According to embodiments of the invention, the two or more plates forming the sandwich insert 100 are provided with manifold forming portions through which hydrogen, air, and cooling water flow at opposite ends thereof.

As illustrated in FIGS. 1 to 4, the sandwich insert 100 according to an embodiment of the present invention is manufactured with a structure in which a first plate 110, a second plate 210, a third plate 310, and a fourth plate 410 are sequentially stacked and bonded by the coupling means 500. Of course, the sandwich insert 100 is not limited as such, but rather could be provided with any suitable number of plates and plate configurations other than the four plates depicted in the Figures.

Figure 1:
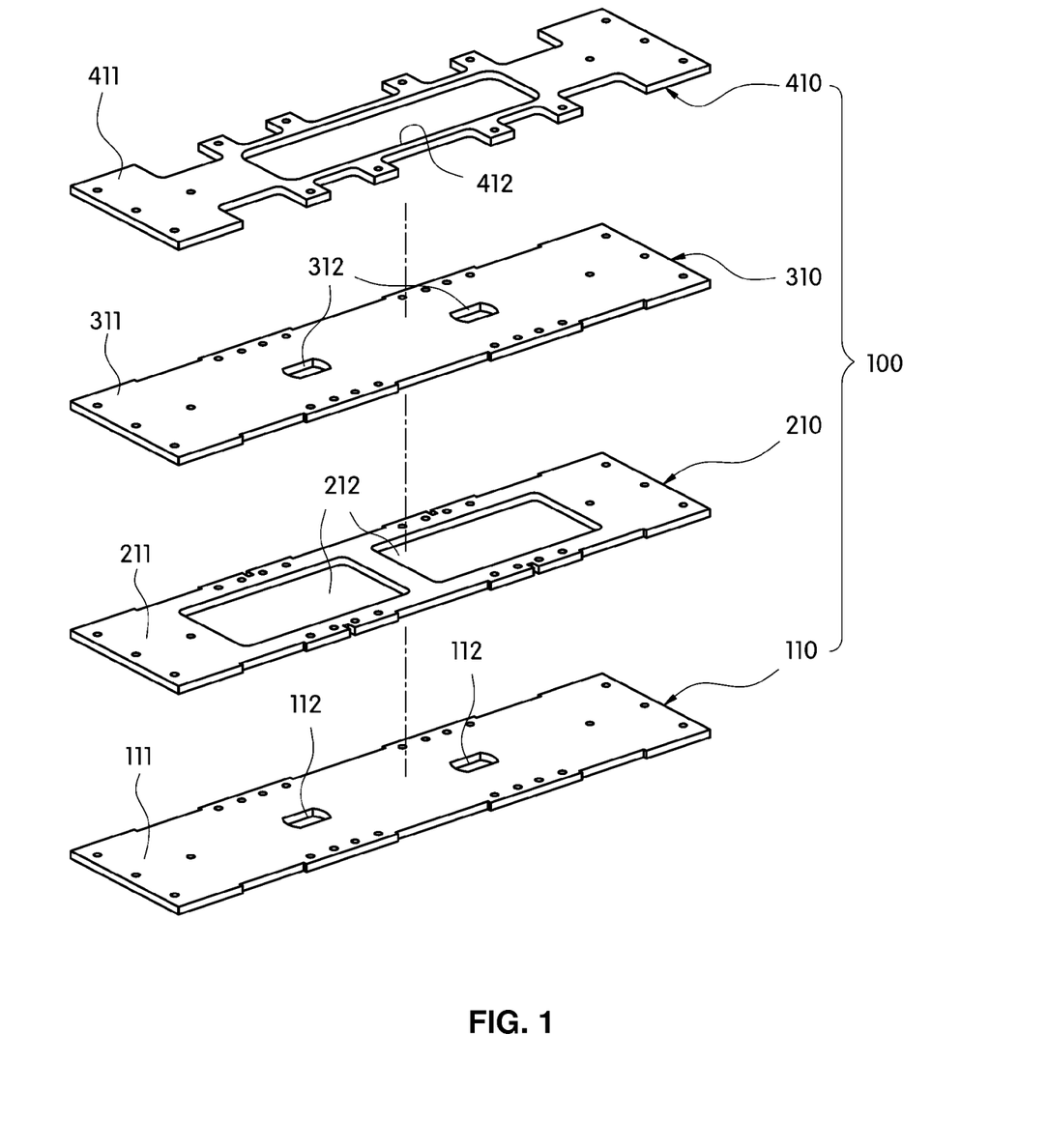
FIG. 1 is an exploded perspective view illustrating a sandwich insert of an end plate for a fuel cell according to an embodiment of the present invention.

As shown, the first plate 110 is disposed at the innermost part of the sandwich insert 100 (on a side of the fuel cell stack) and has a rectangular plate structure. The first plate 110 is provided with a suitable thickness, for example thickness of approximately 4 to 5 t, through any suitable means, such as a conventional machining and pressing process. The first plate 110 has first manifold forming portions 111 formed at opposite ends thereof. As further show, the first plate 110 is provided with first current collector plate coupling openings 112 at a central portion thereof.

The second plate 210 is stacked outside the first plate 110 and is manufactured with a rectangular plate structure. The second plate 210 is likewise provided with a suitable thickness, for example a thickness of approximately 4 to 5 t by any suitable means, such as a conventional machining and pressing process. The second plate 210 has second manifold forming portions 211 formed at opposite ends thereof. As further shown in this embodiment, the second plate 210 is further provided with two or more first material-reducing spaces 212 at a central portion thereof. It is noted, however, that the number and placement of the first material-reducing spaces 212 is not limited to the depicted number and arrangement. Thus, for example, use of a single material-reducing space 212 could also be used in certain embodiments.

In this embodiment, the first material-reducing spaces 212 of the second plate 210 are spaces passing through the second plate 210 in a shape of a rectangular opening, which reduces the weight of the second plate 210 and contributes to the formation of a lightweight sandwich insert 100.

The third plate 310 is stacked outside the second plate 210 and, as shown in this embodiment, has the same shape and structure as that of the first plate 110.

In particular, the third plate 310 is manufactured with a rectangular plate structure with a suitable thickness (e.g. a thickness of approximately 4 to 5 t) by using any suitable means such as a conventional machining and pressing process. As shown, the third plate 310 has third manifold forming portions 311 formed at opposite ends thereof, and third current collector plate coupling openings 312 passing through the third plate 310 at a central portion thereof.

As further shown, the fourth plate 410 is stacked on and bonded to the third plate 310 and is located at the outermost side of the sandwich insert 100. The fourth plate 410 is manufactured with a rectangular plate structure with a suitable thickness (e.g. a thickness of approximately 4 to 5 t) by any suitable means such as a conventional machining and pressing process. Similar to the second plate 210, the fourth plate 410 has fourth manifold forming portions 411 formed at opposite ends thereof. As shown in this embodiment, the fourth plate 410 is further provided with a second material-reducing space 412 at a central portion thereof. As with the second plate 210, that the number and placement of the second material-reducing space(s) 412 is not limited to the depicted number and arrangement.

As set forth in the embodiment depicted in FIG. 1, the first plate 110 and the third plate 310 have a structure having a substantially flat surface, except for the passing current collector plate coupling openings 112 and 312. As shown, the first plate 110 and the third plate 310 are located on upper and lower sides of the second plate 210 which is provided with the first material-reducing spaces 212 for reducing weight, and to make the thicknesses of the materials of the entire metal insert and the end plate uniform.

Figure 2:
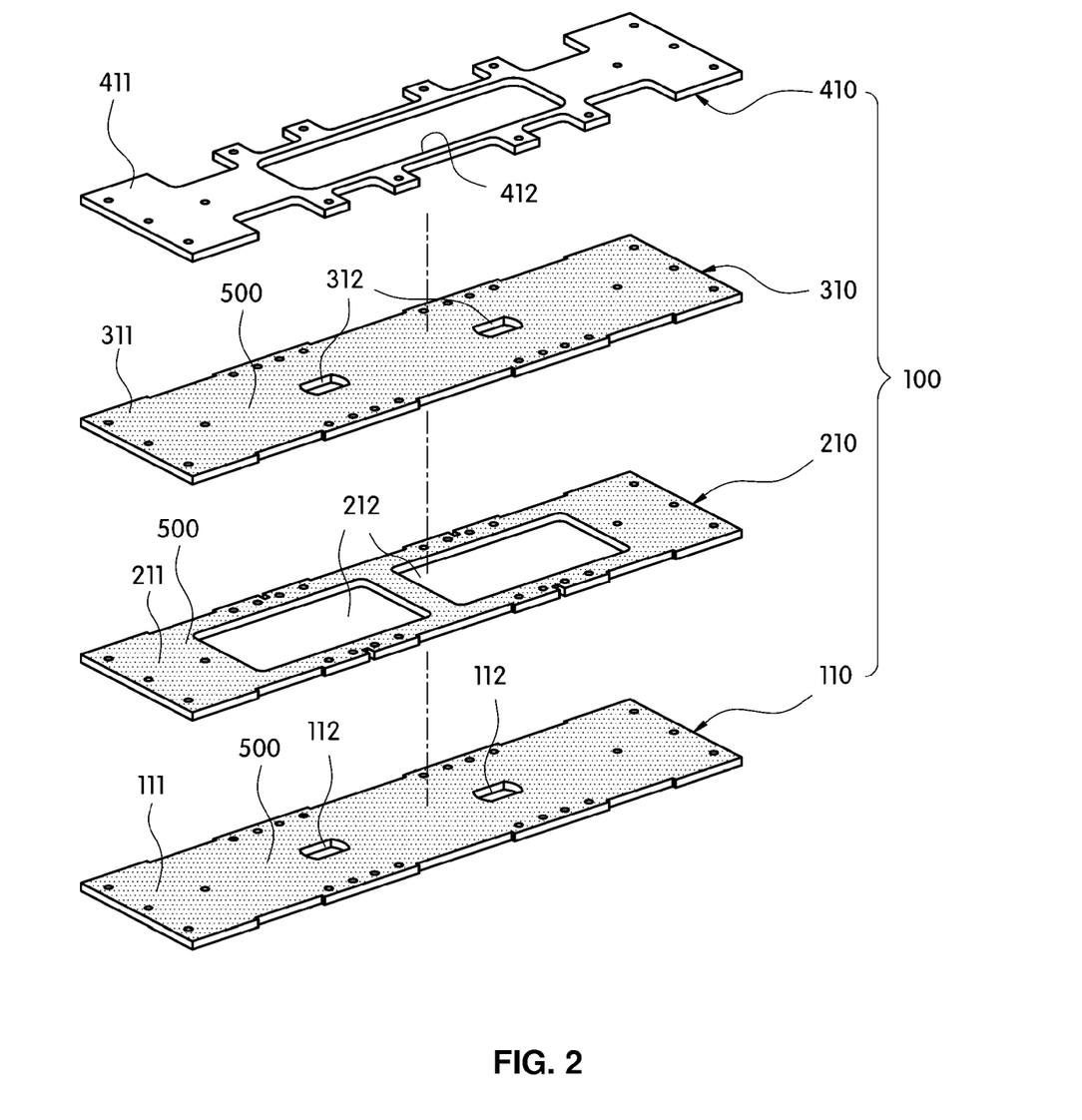
FIG. 2 is an exploded perspective view illustrating a method of bonding the sandwich insert of FIG. 1 according to an embodiment of the present invention.
Figure 3:
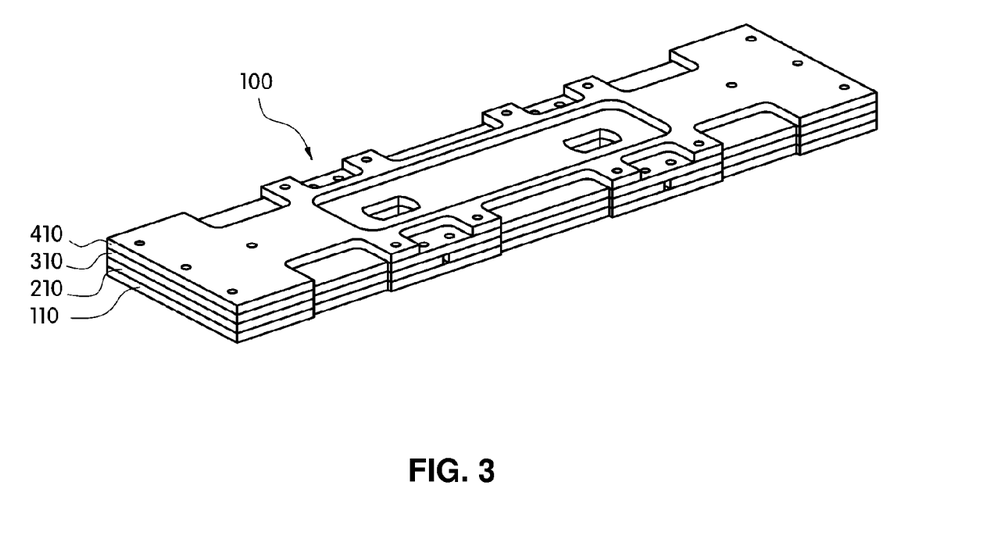
FIG. 3 is a perspective view illustrating an assembled sandwich insert of FIG. 1 according to an embodiment of the present invention.
Figure 4:
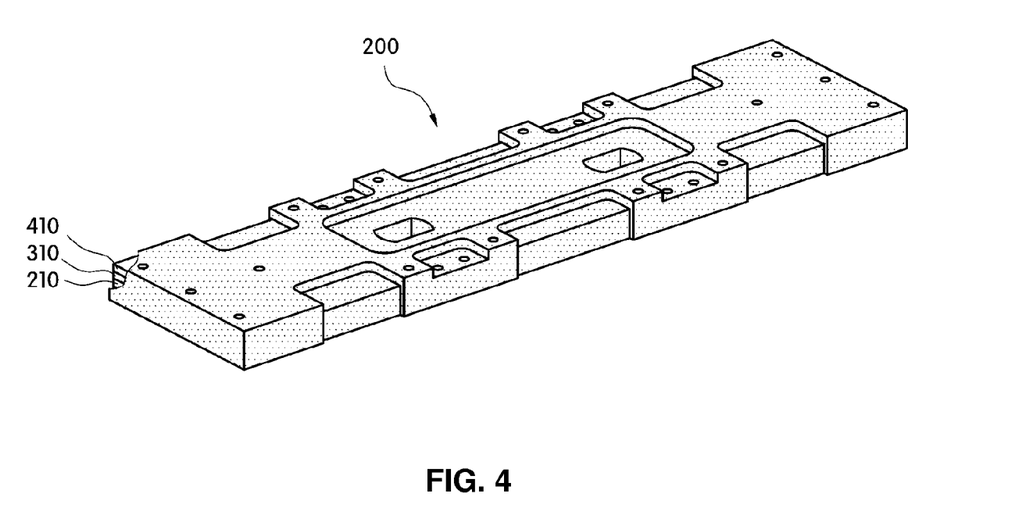
FIG. 4 is a perspective view illustrating an injection molded end plate for a fuel cell according to an embodiment of the present invention.

As shown in FIG. 2, the coupling means 500 for bonding the first to fourth plates may be an adhesive applied between the first to fourth plates. In some embodiments, the adhesive may use a bonding means, such as a liquid type or film type adhesive, capable of resisting a temperature of up to 150 degrees Celsius. According to an alternative embodiment, the first to fourth plates may be stacked through fastening of the ends of the first to fourth plates with a mechanical coupling means, such as a fastening bolt, a fastening rivet, or an assembling pin.

According to the present invention, the first to fourth plates of the sandwich insert 100 may be formed of one or more suitable materials conventionally used in forming inserts. For example, the first to fourth plates may be formed of a steel material, a nonmetallic material, and a carbon-based material. Further, the first to fourth plates may be beneficially formed of different materials in order to further enhance the lightweightedness of the sandwich insert.

For example, according to one embodiment, only the first plate is made of steel and the remaining second to fourth plates are made of a light carbon-based material. Such a structure would make it is possible to further achieve a sandwich insert 100 that is lightweight while also maintaining strength.

Hereinafter, an end plate according to another embodiment of the present invention will be described.

The end plate according to this embodiment of the present invention is substantially identical to the end plate according the aforementioned embodiment of the present invention in that the end plate includes the sandwich insert 100 in which two or more plates having manifold forming portions through which hydrogen, air, and cooling water flow at opposite ends thereof are bonded by the coupling means 500, and the plastic injection molded body 200 is injection molded by surrounding the sandwich insert 100 with the plastic injection molding material. The end plate is further the same in that the sandwich insert 100 is manufactured with a structure in which the first plate 110, the second plate 210, the third plate 310, and the fourth plate 410 are sequentially stacked and bonded by the coupling means 500. However, the end plate according to this embodiment of the present invention has a feature in that an additional structure is added which is capable of preventing the sandwich insert 100 from being bent due to a resin pressure in the plastic injecting molding process.

Figure 5:
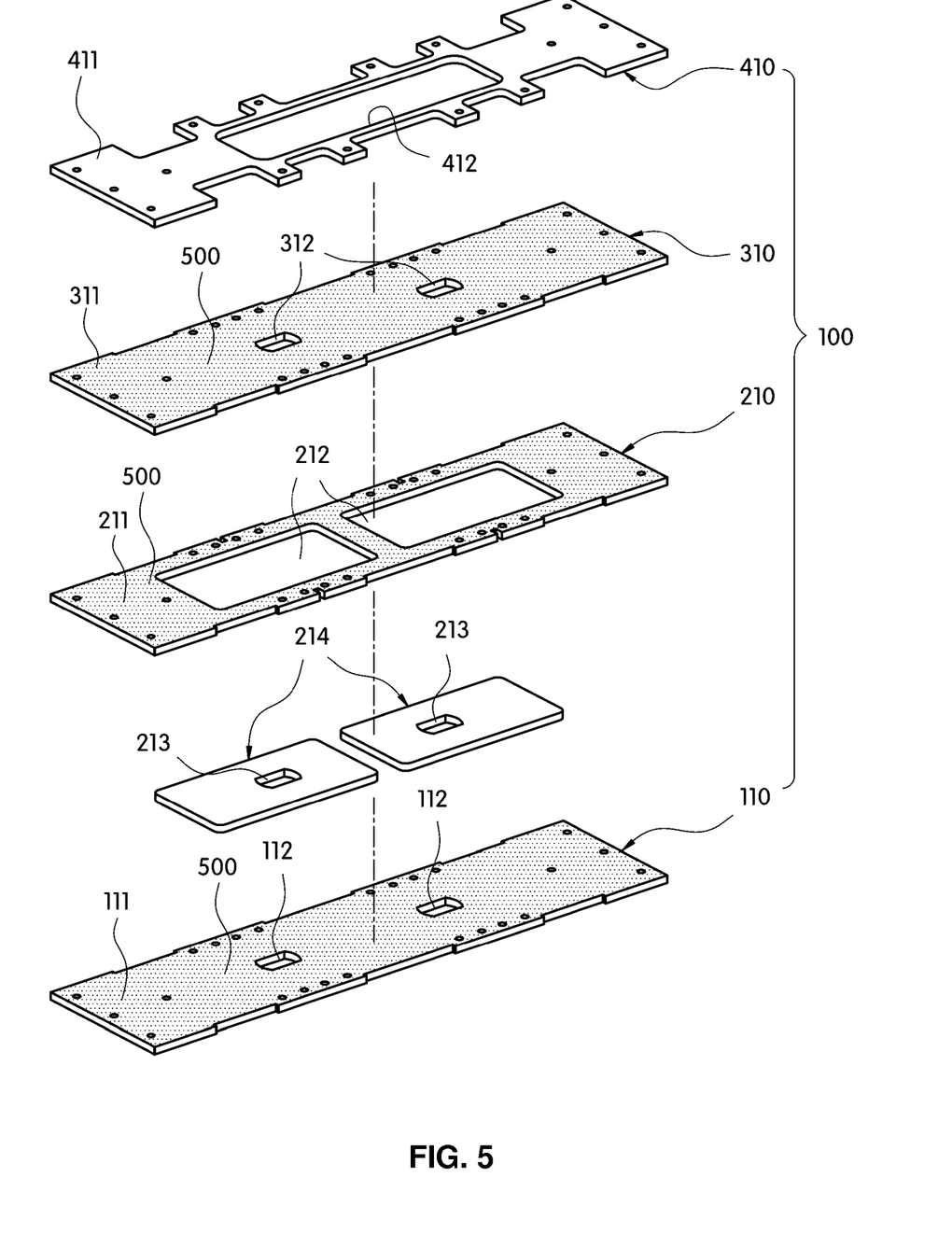
FIG. 5 is an exploded perspective view illustrating a sandwich insert of an end plate for a fuel cell according to another embodiment of the present invention.

In particular, as illustrated in FIG. 5, the first material-reducing spaces 212 of the second plate 210 are provided as two empty spaces passing through the second plate 210 for reducing weight. However, as shown, anti-bending plates 214 are inserted into the first material-reducing spaces 212 so as to prevent the sandwich insert 100 from being bent. These anti-bending plates 214 may suitably for formed of a very lightweight material so as to maintain the lightweightedness of the overall sandwich insert 100.

In particular, as shown in FIG. 5 the anti-bending plate 214 is a rectangular plate having a second current collector plate coupling opening 213, and is manufactured to have the same thickness as that of the second plate 210 so that the anti-bending plate 214 is inserted into the first material-reducing space 212 while forming the same plane with the second plate 210 (i.e., so as to not protrude beyond the surface of the second plate 210 when inserted through the first material-reducing spaces 212. According to various embodiments, the anti-bending plate 214 is made of a plastic material or a light metal material for achieving a lightweight structure.

Therefore, when the thus described sandwich insert 100, in which the first plate, the second plate 210 including the anti-bending plates 214, and the third plate are stacked and bonded, is disposed inside the injection mold and a plastic injection molding resin is injected into the injection mold, even though a pressure of the injected resin is applied to one surface of the metal insert 100, the overall strength of the metal insert 100 is reinforced by the anti-bending plate 21. As such, the metal insert 100 is easily prevented from being bent due to the resin pressure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The contents of all references (including literature references, issued patents, published patent applications, and co-pending patent applications) cited throughout this application are hereby expressly incorporated herein in their entireties by reference.

What is claimed is:

1. An end plate for a fuel cell, comprising:
a sandwich insert having a sandwich structure in which two or more plates are bonded by a coupling means,
wherein outer-surfaces of the sandwich inserts are surrounded by a plastic injection molding material,
wherein the sandwich insert comprises:
a first plate having first openings for coupling a current collector plate at a central portion thereof and first manifold forming portions;
a second plate having two or more first material-reducing spaces at a central portion thereof and second manifold forming portions;

a third plate having third openings for coupling the current collector plate at a central portion thereof and third manifold forming portions; and wherein the second plate is disposed between the first plate and the third plate.

2. The end plate of claim 1, further comprising one or more anti-bending plates inserted into one or more of the first material-reducing spaces of the second plate so as to prevent the sandwich insert from being bent, the anti-bending plates having second current colleting plate coupling openings.

3. The end plate of claim 1, wherein the coupling means is selected from a bonding means and a mechanical coupling means.

4. The end plate of claim 3, wherein the bonding means is a liquid or film type adhesive.

5. The end plate of claim 3, wherein the mechanical coupling means is a bolt, a rivet, or an assembling pin.

6. The end plate of claim 1, wherein the sandwich insert is made of at least one material selected from a steel material, a nonmetallic material, a carbon-based material, and a composite material.

7. The end plate of claim 6, wherein two or more of the plates are made of different materials.

8. The end plate of claim 1, wherein an area of the first material-reducing space is not only larger than an area of the first opening but larger than an area the third opening.

* * * * *